UNITED STATES PATENT OFFICE.

GEORGE W. EACHUS, OF GREENCASTLE, PENNSYLVANIA, ASSIGNOR TO ADDISON IMBRIE AND JOHN S. PITTENGER, OF SAME PLACE.

REMEDY FOR HOG-CHOLERA.

SPECIFICATION forming part of Letters Patent No. 340,771, dated April 27, 1886.

Application filed October 3, 1885. Serial No. 178,866. (No specimens.)

*To all whom it may concern:*

Be it known that I, GEORGE W. EACHUS, a citizen of the United States, residing at Greencastle, in the county of Franklin and State of Pennsylvania, have invented a new and useful Composition of Matter to be Used for the Prevention and Treatment of Hog-Cholera, of which the following is a specification.

My composition consists of the following ingredients, combined in the proportions stated, viz: water, one gallon; coal-oil, one-half gallon; spirits of turpentine, one quart; sulphate of iron, (pulverized,) one pound; charcoal, (pulverized,) one-fourth pound; flowers of sulphur, one-half pound; carbolic acid, one ounce, these ingredients to be thoroughly mingled by agitation, to be used as a preventive by giving one table-spoonful to each grown hog twice a week; when sick, one table-spoonful three times a day to each grown hog. For pigs, half the above quantity should be given, in every case to be mixed with swill or milk. I use the coal-oil, on account of its penetrating properties, to kill the lice and nits on the animal. I am convinced that the disease gets its origin from the louse-nit. The coal-oil will kill these by penetrating the system. The turpentine is used as a diuretic, as the kidneys are always more or less affected; the sulphate of iron as a tonic to build up the debilitated condition of the hog. I use charcoal for an antiseptic, to prevent mortification, as I have found this to have set in before death. I use the flowers of sulphur as a laxative, diaphoretic, and resolvent, and the carbolic acid as a disinfectant and deodorizer, and also to destroy all low orders of insect life in the animal, including trichinæ.

I am aware that each of the ingredients has been recommended for use in this disease and in various mixtures, such as shown on pages 431, 438, and 451 of the Agricultural Department Report for 1877—viz., copperas, charcoal, and sulphur; coal-oil, copperas, charcoal, and sulphur; also, copperas, spirits of turpentine, charcoal, sulphur, and carbolic acid. Such, therefore, I do not claim; but

What I claim, and desire to secure by Letters Patent, is—

The remedy for hog-cholera, consisting of water, coal-oil, spirits of turpentine, sulphate of iron, charcoal, sulphur, and carbolic acid, in the proportions stated.

GEORGE W. EACHUS.

Witnesses:
 BENJAMIN PALMER,
 HEUSTON W. PITTENGER.